United States Patent [19]
Carroll

[11] Patent Number: 5,400,235
[45] Date of Patent: Mar. 21, 1995

[54] HIGH FREQUENCY ENERGY SAVING DC TO DC POWER CONVERTER

[75] Inventor: Lawrence B. Carroll, Endwell, N.Y.

[73] Assignee: International Business Machines Corp., Armonk, N.Y.

[21] Appl. No.: 927,088

[22] Filed: Aug. 7, 1992

[51] Int. Cl.⁶ .......................................... H02M 3/335
[52] U.S. Cl. ...................................... 363/17; 363/56; 363/40; 363/98; 363/132
[58] Field of Search .................. 363/17, 16, 56, 39, 363/73, 40, 98, 79, 132, 131, 95, 97

[56] References Cited

U.S. PATENT DOCUMENTS

| | | | |
|---|---|---|---|
| 3,737,755 | 6/1973 | Calkin et al. | 321/2 |
| 3,902,107 | 8/1975 | Brown | 321/12 |
| 4,099,225 | 7/1978 | Nygaard | 363/56 |
| 4,566,059 | 1/1986 | Gallios et al. | 363/17 |
| 4,570,212 | 2/1986 | Edwards et al. | 363/138 |
| 4,580,205 | 4/1986 | Matsuse | 363/37 |
| 4,638,138 | 1/1987 | Rosa et al. | 363/136 X |
| 4,670,833 | 6/1987 | Sachs | 363/132 |
| 4,691,270 | 9/1987 | Pruitt | 363/56 |
| 4,721,897 | 1/1988 | Matsuse et al. | 363/58 X |
| 4,761,722 | 8/1988 | Pruitt | 363/17 |
| 4,937,725 | 6/1990 | Dhyanchand et al. | 363/56 |
| 5,019,952 | 5/1991 | Smolenski et al. | 363/16 |

FOREIGN PATENT DOCUMENTS 0063076  4/1983  Japan ..................................... 363/58

OTHER PUBLICATIONS

IEEE Power Electronics Vo. 3 No. 1. Jan. 1988 Recovery Circuit for Snubber Energy in Power Electronic Applications with High Switching Frequencies pp. 26–29. J. C. Bendien & H. Van Der Broeck, G. Fregien.

IEEE Transactions on Industry Applications vol. 1A-12, No. 4 Jul./Aug. 1970 Aconceptually New Approach for Regulated DC to DC Converters Employing Transistor Switches and Pulsewidth Control pp. 369–377.

Primary Examiner—Steven L. Stephan
Assistant Examiner—Adolf Berhane
Attorney, Agent, or Firm—Eugene I. Shkurko; William H. Steinberg; Lynn L. Augspurger

[57] ABSTRACT

A DC to DC power converter circuit has a current fed inverter with a series connected first diode and a capacitor connected in parallel with the legs of the inverter. The diode is poled to provide current to the capacitor at the beginning of each inverter switching cycle as energy is passed from the circuit to an output transformer-rectifier circuit. A recirculation inductor and an additional diode are connected in parallel with the legs of the inverter with the additional diode poled to recirculate current in the recirculation inductor. Then a switch between the junction of the capacitor and first diode and also between the additional diode and recirculation inductor provides for discharging of the capacitor without power dissipation during the inverter operation instead of dissipating and losing the energy. Thus the recirculation is accomplished by few components to provide a lossless clamp circuit for recirculating the energy in the circuit from the capacitor back to the recirculation inductor. Each switch of the inverter has an FET with zener diode protection. The inverter is packaged in a hybrid module.

7 Claims, 2 Drawing Sheets

HIGH FREQUENCY ENERGY SAVING DC TO DC POWER CONVERTER

FIELD OF THE INVENTION

The invention relates to a DC to DC power converter and modules which can use the power converter in computer applications to save energy.

CROSS REFERENCE TO RELATED APPLICATIONS

The present application related to the following co-pending patent application: U.S. patent application Ser. No. 07/926,988, filed Aug. 7, 1992, by the same inventor, Lawrence B. Carroll, entitled "THREE PHASE AC TO DC POWER CONVERTER". This co-pending application is filed concurrently therewith.

The co-pending application and the present application are owned by one and the same assignee, International Business Machines Corporation of Armonk, N.Y.

The description set forth in these co-pending application is hereby incorporated into the present application by this reference.

BACKGROUND OF THE INVENTION

The invention here relates to improving power converters. DC to DC power converters are used in computer applications where high frequency switching is required. In the prior ad there exists U.S. Pat. No. 3,737,755 which used a zener diode to limit voltage transients across inverter switches in a power converter application. This and other approaches which have been used before dissipate power and are therefore inefficient. There is a need to improve energy efficiency, and it will be desirable to supply power supplies for computer systems which are highly energy efficient which is especially important where high power supplies are needed in computer applications.

Also in the prior art are publications. The IEEE Transactions on Industry Applications, Vol. 1A-12, No. 4, July/August 1976 contains the article by E. T. Calkin et al, entitled "A Conceptually New Approach for Regulated DC to DC Converters Employing Transistor Switches and Pulsewidth COntrol", pages 369-377. Our invention could be used with this topology, see page 375.

Recovery of energy in switching regulators is discussed in other applications, see IEEE Transactions on Power Electronics, Vol. 3, No. 1, January 1988, pp26-30. However, the use of some sod of energy recovery for current fed inverters is not suggested.

SUMMARY OF THE INVENTION

For the high frequency applications of power as necessary for computer application, the use of energy is important. Instead of dissipating energy as in the past, a circuit has been provided which can be used such that a capacitor and an inductor are employed with a diode to permit the discharging of the capacitor to recirculate energy through a recirculation inductor so that the opening of a switch can reopen the energy stored in the inductor to pass the energy to a transformer with the use of a control diode.

The current fed inverter portion of the circuit can be provided in the form of a module which controls the switching of current though the inverter. Each switch of the inverter has an FET with zener diode protection. In accordance with the invention, the current fed inverter will have an inductance with current fed to the inductor. A series connected first diode and a capacitor will be connected in parallel with the legs of the inverter, with the diode poled to provide current to the capacitor at the beginning of each inverter switching cycle as energy is passed from the circuit to an output transformer-rectifier circuit. A recirculation inductor and an additional diode are connected in parallel with the legs of the inverter with the additional diode poled to recirculate current in the second inductor. Then a switch between the junction of the capacitor and first diode and also between the additional diode and recirculation inductor provides for discharging of the capacitor without power dissipation during the inverter operation instead of dissipating and losing the energy. Thus the recirculation is accomplished by few components to provide a lossless clamp circuit for recirculating the energy in the circuit from the capacitor back to the recirculation inductor.

These and other improvements are set forth in the following detailed description. For a better understanding of the invention with advantages and features, refer to the description and to the drawings.

Our detailed description explains the preferred embodiments of our invention, together with advantages and features, by way of example with reference to the following drawings.

DETAILED DESCRIPTION OF THE INVENTION

DC to DC converter power density and efficiency improvement for circuits which employ a buck regulator for feeding a load represented by an unregulated power converter for high frequency applications is now possible. The power converter can be employed in AC and DC applications, and the preferred DC to DC power convertor module can be employed in computer system applications to make computers more energy efficient. Essentially, the inductor L2 and the transformer lose energy during the end of the cycle because power available is dissipated during the course of normal operation in other circuits.

Figure 1:
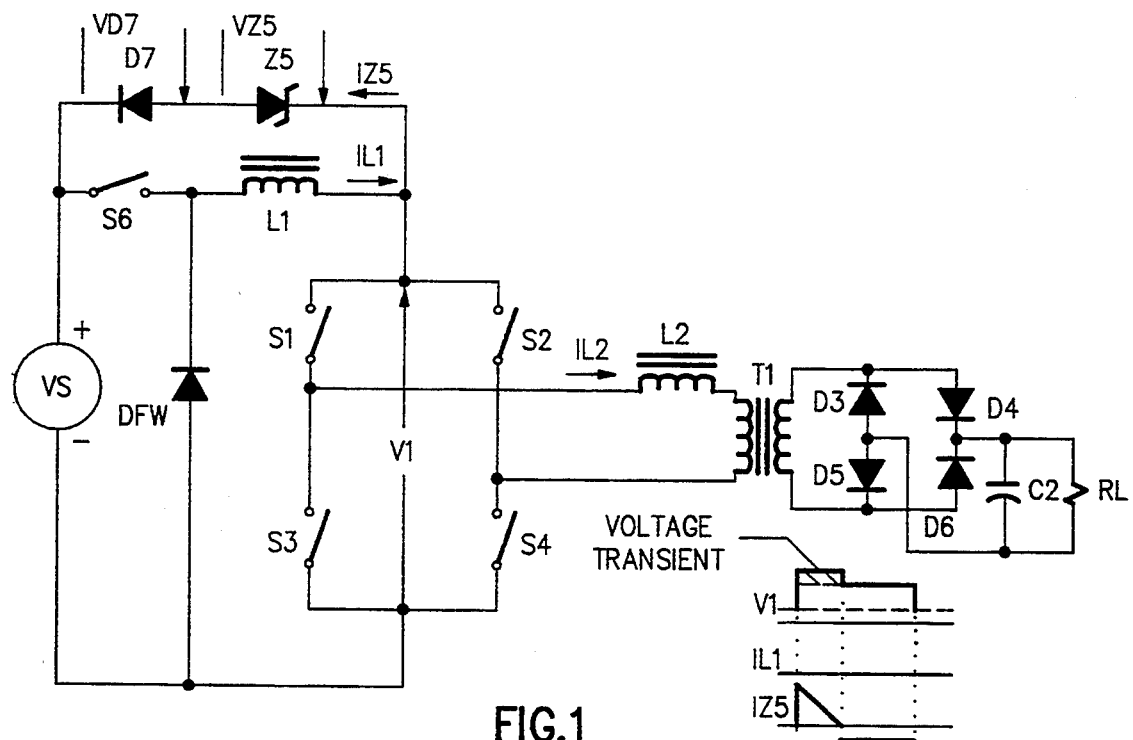
FIG. 1 shows a converter circuit which dissipates power.
Figure 2:
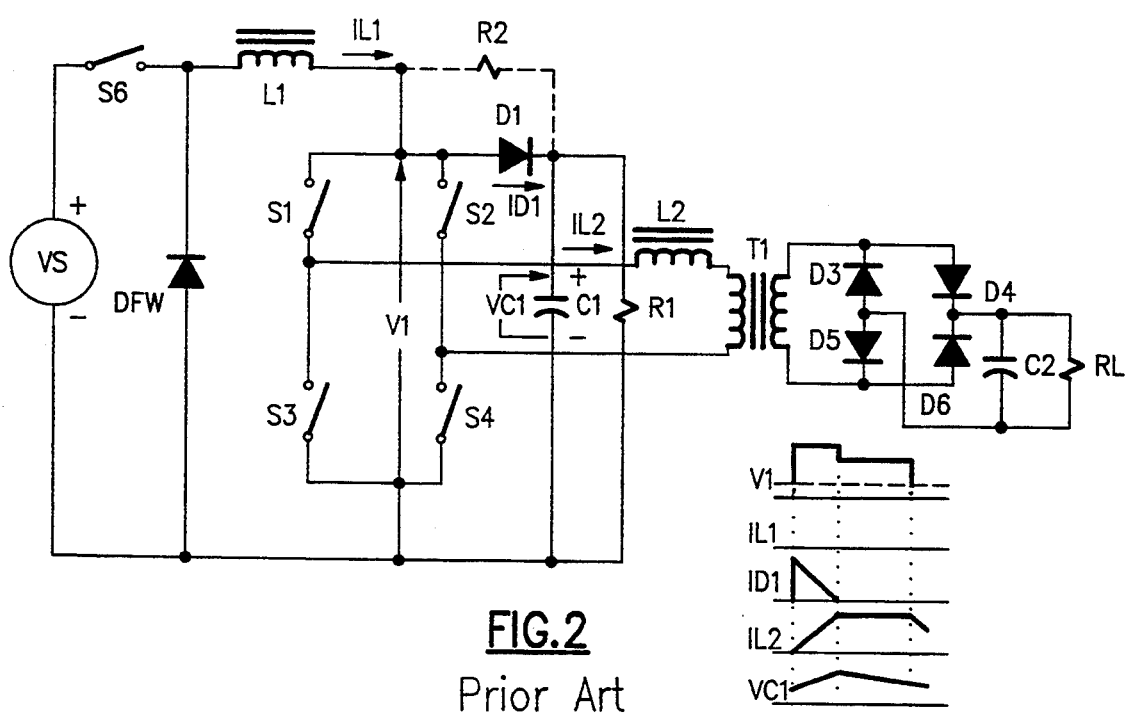
FIG. 2 shows another converter circuit which dissipates power.

Before the description of the most preferred embodiment, as additional background, less efficient power converters will be described which can be used in similar applications with a couple of approaches which are modifications which still require dissipation, as illustrated in FIGS. 1 and 2.

In all approaches a buck regulator comprising a source VS, a switch S6, a diode and an inductor L1 provide a buck regulator for feeding a load. The load comprises an unregulated power converter circuit having a current controlled inverter with a plurality of current source switches having an "H" bridge configuration with a time overlap of approximately 0.5 to 2.5 times the reverse recovery time of an output device feed by the device at RL. Our power inverter is a current-fed "H" bridge circuit using pulse-width-modulation in boost mode or fixed duty cycle mode. The circuit has a transformer T1 having a primary and secondary winding, and there is a leakage inductance L2. In two approaches considered, a power dissipating circuit needs to be provided for dissipating power.

The first approach is illustrated by FIG. 1 shows a DC to DC converter similar to that described in U.S. Pat. No. 3,737,755. In that patent a zener diode is used to limit the voltage transient across the inverter switches. Zener diode Z5 is used for this purpose in FIG. 1. Referring to FIG. 1, the voltage transient across the inverter switches S1, S2, S3 and S4 occurs at the beginning of each power converter switching cycle as inductor L1 tries to supply or source current into inductor L2. (Inductor L2 represents the leakage inductance of a transformer T1). This condition results from inverter switches S1, S2, S3 and S4 during a switching cycle all closing together, for an overlap period, at the end of the previous switching cycle. The action allows inductor current IL1 to continue flowing with little change in value while inductor current IL2 goes to zero by giving up its energy to a driven output represented by resistance load RL. As a result, when any two diagonal switches of the current controlled inverter (i.e., S1, S4, or S2, S3) opened to begin the next switching cycle, the inductor current IL1 runs into an inductance L2 forcing the current for the zener dissipation circuit IZ5 to flow into the zener diode Z5 until the inductor current IL2 builds up to the value of the inductor current IL1. This limits the voltage at VI to the voltage VZ5+VS (VD7 representing the voltage across diode D7 being insignificant). The scheme works fine except that switches S1-S4 must be rated for VZ5+VS and there is a loss of power which is dissipated in zener diode Z5. FIG. 2 shows something else which could be used to to limit the voltage transient. In this alternative approach the inductor current IL1 forces the current ID1 until the current at inductor IL2 builds up to inductor current IL1. Current ID1 flows into a capacitor C1 which is charged from previous switching cycles to a capacitor voltage level VC1. With current ID1 flowing into C1, the voltage at the capacitor VC1 will increase. By properly sizing the capacitor C1, to keep the voltage VC1 is kept from increasing to a high level with successive switching cycles. Again the alternative approach provides resistances R1, R2, which are used to continually discharge the capacitor C1 to keep VC1 from increasing to a high level with successive switching cycles. Again R1 (or R2) dissipates power. In high power converters, of the type shown in FIGS. 1 and 2, such dissipation is undesirable.

DESCRIPTION OF PREFERRED EMBODIMENT

Figure 3:
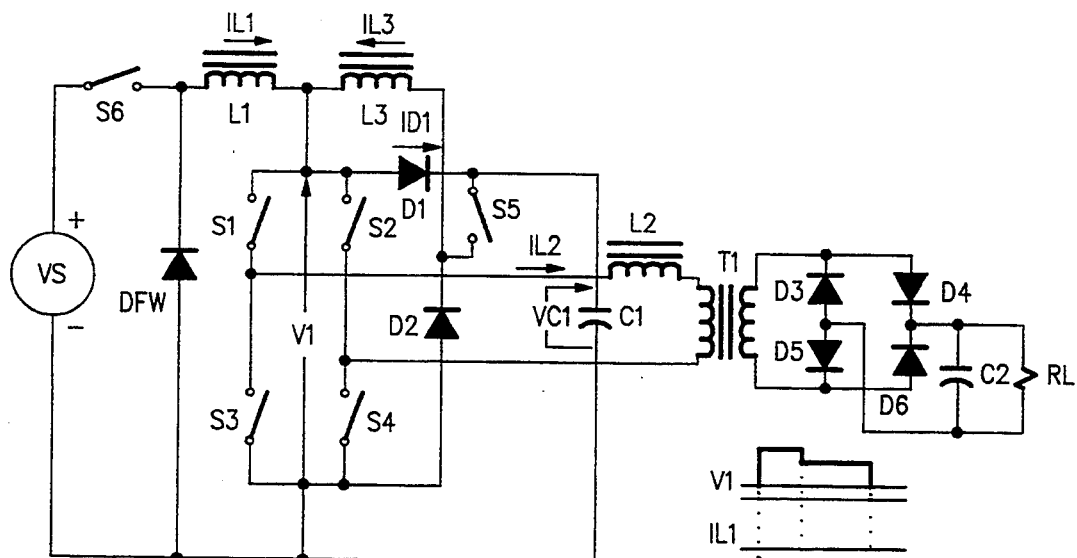
FIG. 3 shows schematically the preferred embodiment which provides for energy recirculation.

One can avoid both the prior art zener diode dissipation and the alternative approach which was developed and described with respect to FIG. 2 which also dissipates power. The solution may be thought of as a recirculating energy resource which permits discharging the capacitor C1 without power dissipation. The circuit for discharging C1 without power dissipation is shown in FIG. 3. In this circuit resistors R1 (or R2) of FIG. 2 are replaced by the switch S5, a diode D2 and an inductor L3. The diode is a free wheeling diode. Switch S5 closes at the beginning of each switching cycle causing current IL3 to flow as soon as current through ID1 diode D1 stops. Current IL3 flows in a controlled fashion depending on the capacitor voltage VC1 and source voltage V1. If switch S5 remains closed long enough for the capacitor's voltage VC1 to discharge to V1, the current at IL3 will continue to circulate in inductor L3, diode D1 and switch S5. When switch S5 is opened, sometime before the end of the switching cycle, the current illustrated by IL3 will flow through diode D2 until inductor L3 has given up all its energy to the output device (resistance load RL). The circuit is then ready for the next switching cycle.

Thus the current fed inverter which provides energy savings has a current fed inverter including a first leg having a first (S1) and second (S3) series connected switches, and a second leg in parallel with the first leg having a third (S2) and a fourth (S4) series connected switches. A buck regulator includes a first inductor (L1) providing current to the inverter from a power source. The inverter itself has a series connected first diode (D1) and a capacitor (C1). The series combination is connected in parallel with the first and second legs of the inverter, and the first diode (D1) is poled to provide current to the capacitor at the beginning of each inverter switching cycle. In order to supply DC output, a transformer (T1) having a primary and secondary is connected to a rectifier circuit which includes diodes D3, D4, D5, and D6. The rectifier output can be used to control the switching of the buck regulator. The primary of the transformer is connected to the junction of the inverter switches in the first and second legs of said inverter. A series connected second inductor (L3) and second diode (D2) are connected in parallel with the first and second legs of the inverter. The second diode is poled to permit circulating current in said second recirculation inductor L3. For this purpose a fifth switch (S5) is connected between the junction of the capacitor and the first diode (D1), and the junction between second diode (D1) and second inductor (L3) for discharging the capacitor without power dissipation during inverter operation.

A Module for a Current Fed Inverter

Figure 4:
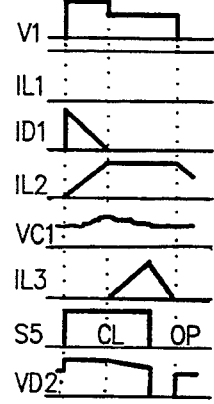
FIG. 4 shows the preferred inverter module.
Figure 4:
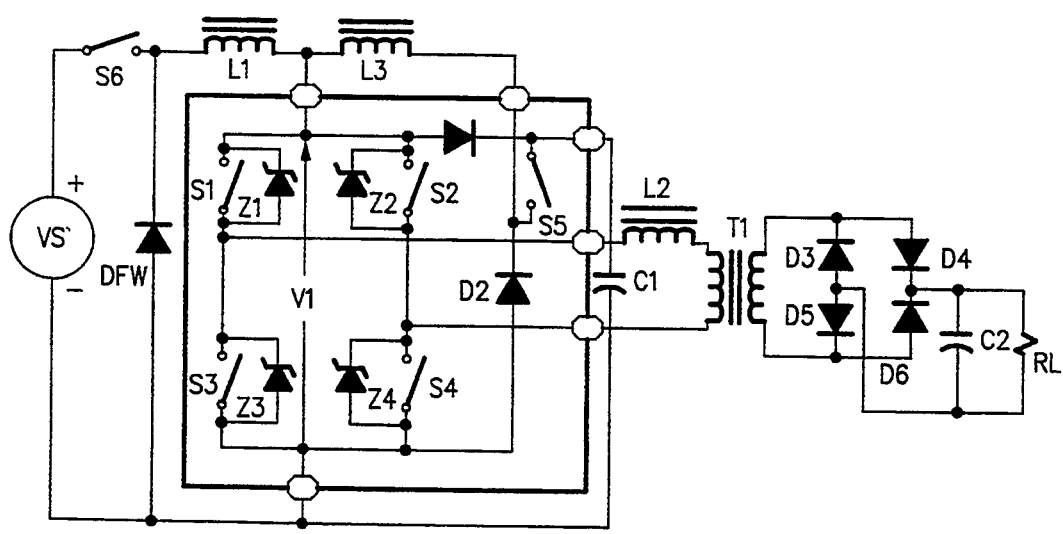

S1, S2, S3, S4, S5, D1, and D2, in FIG. 3 are preferably packaged in a power hybrid module. As illustrated in FIG. 4, the module for a current fed inverter has a module circuit including a first leg having a first (S1) and second (S3) series connected switches and a second leg in parallel with the first leg having a third (S2) and a fourth (S4) series connected switches. The first diode (D1) and a second diode (D2) and a fifth switch (S5) are connected in the series combination shown. The first diode is series connected to the fifth switch and in series with said second diode, and the series combination is connected in parallel with the inverter legs. The first and second diodes are poled to carry current in opposite directions.

Using the module, the current fed inverter switch can be used for power recirculation by use as an element of the circuit in which the module is used. The capacitor (C1) is provided and the first diode and the capacitor are series connected, and the series combination connected in parallel with the first and second legs of the inverter. The diode (D1) is poled to provide current to the capacitor at the beginning of each inverter switching cycle. The diagrams of FIG. 3 are applicable also to FIG. 4.

It should be noted that in the principal circuit and in the one in which the module is an element of the high frequency (computer needed) current fed converter circuit, the capacitor (C1) is connected in series with the first diode, and there is a series connected recirculation inductor (L3), the series connected recirculation inductor (L3) and second diode (D2) is connected in parallel with said first and second legs of the inverter, said second diode poled to permit circulating current in said recirculation inductor. The fifth switch (S5) is connected between the junction of the capacitor and the first diode and the junction between said second diode and second inductor for discharging the capacitor without power dissipation during inverter operation.

The switches in the module are provided by switches formed by power FET's with appropriate gate resistors and protection zener diodes, where switches S1, S2, S3 and S4 of the inverter have the protection of zener diodes Z1–Z4 respectively.

The preferred embodiment saves energy and a recirculating energy resource by providing a lossless clamp which can be used with a current-fed inverter in high frequency applications. The technique is applicable to any current-fed "H" bridge circuit using pulse-width-modulation in boost mode or fixed duty cycle mode. The complete current fed chopper allows a lossless clamp circuit to be provided in a hybrid module.

Applications

The invention can be used in a 16 KW power converter for computer systems. These systems require a high frequency transformer and a fixed frequency inverter and the recirculating energy recovery circuit makes the systems much more energy efficient by utilization of the described clamp circuit shown in FIG. 3 and the same circuit in hybrid module shown in FIG. 4.

While the preferred embodiments of the invention have been described, it will be understood that those skilled in the art, both now and in the future, may make various improvements and enhancements which fall within the scope of the claims which follow. These claims should be construed to maintain the proper protection for the invention first disclosed.

What is claimed is:

1. A current fed inverter circuit, comprising:
   a current fed inverter including a first leg having a first (S1) and second (S3) series connected switches and a second leg in parallel with the first leg having a third (S2) and a fourth (S4) series connected switches;
   a first inductor (L1) connected between the inverter and a power source for providing current to the inverter from the power source;
   a series connected first diode (D1) and a capacitor (C1), the series combination connected in parallel with said first and second legs, said diode (D1) poled to provide current to said capacitor at the beginning of each inverter switching cycle;
   a transformer (T1) having primary and secondary windings, the primary winding of the transformer connected to the junction of the inverter switches in the first and second legs of said inverter;
   a series connected second inductor (L3) and second diode (D2) connected in parallel with said first and second legs of the inverter, said second diode poled to permit circulating current in said second inductor; and
   a fifth switch (S5) connected between the junction of said capacitor and said first diode, and the junction between said second diode and second inductor for discharging the capacitor without power dissipation during inverter operation.

2. A current fed inverter circuit, according to claim 1, wherein the switches of the current controlled inverter each comprises an FET with a zener diode protection.

3. A current fed inverter circuit packaged in a module, said module comprising:
   a current fed inverter including a first leg having a first (S1) and second (S3) series connected switches and a second leg in parallel with the first leg having a third (S2) and a fourth (S4) series connected switches;
   a first diode (D1), a second diode (D2), and a fifth switch (S5) connected between Said first and second diodes, said first diode, said fifth switch, and said second diode connected in series, and the series combination being connected in parallel with said first and second legs of the inverter; and
   a capacitor (C1), wherein the first diode and the capacitor are series connected, and the series combination connected in parallel with said first and second legs of the inverter, said diode (D1) poled to provide current to said capacitor at the beginning of each inverter switching cycle.

4. A current fed inverter circuit according to claim 3, wherein said first and second diodes are poled to carry current in opposite directions.

5. A current fed inverter circuit according to claim 3, further comprising:
   a recirculation inductor connected in series with the second diode (D2), the series combination being connected in parallel with said first and second legs of the inverter, said second diode poled to permit circulating current in said recirculation inductor, and wherein said fifth switch (S5) is connected between the junction of said capacitor and said first diode, and the junction of said second diode and said recirculation inductor, for discharging the capacitor without power dissipation during inverter operation.

6. A current fed inverter circuit according to claim 3, wherein the first, second, third, and fourth switches each comprises an FET with a zener diode protection.

7. A high frequency current fed power converter circuit, comprising:
   a buck regulator coupled to an energy source and having a buck switch (S6), a free wheeling diode (DFW) and a buck inductor (L1);
   a nonregulated current controlled inverter circuit including a first leg having a first (S1) and a second (S3) series connected switches and a second leg in parallel with the first leg having a third (S2) and a fourth (S4) series connected switches, a series connected first diode (D1) and a capacitor (C1), the series combination connected in parallel with said first and second legs, said diode (D1) poled to provide current to said capacitor at the beginning of each inverter switching cycle, a second inductor (L3) and a second diode (D2), said second diode poled to permit circulating current in said second inductor, and a fifth switch (S5), the second diode and fifth switch being connected such that the discharging of the capacitor through the fifth switch provides the circulating current in said second inductor, and when the fifth switch reopens, the energy stored in the recirculating inductor is passed to the inverter; and
   an output device comprising a transformer and a rectifier circuit for providing a DC output;
   said buck regulator feeding the nonregulated current controlled inverter circuit, said nonregulated inverter circuit coupled between said buck regulator and the output device.

* * * * *